United States Patent Office 3,052,568
Patented Sept. 4, 1962

3,052,568
QUICK DRYING PRINTING INK AND METHOD OF DRYING SAME
Benjamin L. Sites, Elmhurst, and Meyer S. Agruss, Chicago, Ill., assignors to Miehle-Goss-Dexter, Inc., Chicago, Ill., a corporation of Delaware
No Drawing. Filed Aug. 15, 1958, Ser. No. 755,127
18 Claims. (Cl. 117—93)

This invention relates to the art of coating materials. It has particular reference to an improved quick-drying vehicle of the drying oil type for various coatings and to an improved method for rapidly indurating or drying such a vehicle after the coating operation.

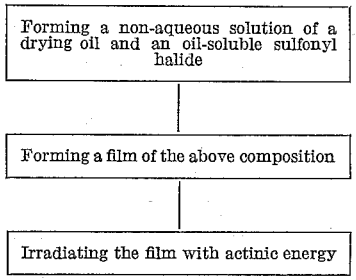

The invention is applicable generally to coating materials utilizing a drying oil type of vehicle, where quick drying of the vehicle is desired. The term coating materials is intended to cover such vehicles or materials which embrace the characteristics of the subject invention and which may have applications in fields other than those specifically mentioned herein, such as, for example, photosensitive resists for use in the graphic arts, plugging materials for use in the drilling operations encountered in the petroleum industries, and the like. However, for illustrative purposes, and with no intent to limit its field of use, the invention will be described with particular reference to printing, wherein the coat-forming material is applied by a conventional printing plate.

Printing inks as made heretofore generally consist mainly of a non-aqueous vehicle, namely a drying oil, pigmented to the desired color. For some purposes the printing ink need not contain a pigment, for example, in over-printing. The drying oils commonly used for printing inks, such as tung oil, linseed oil, rape seed oil, and dehydrated castor oil, have by nature a drying rate which is slow compared to the potential operating speeds of printing presses, even when the usual driers (e.g. cobalt) are added to the oils. Particularly with the advent of the higher speed presses and multiple color printing, the avoidance of smudges and off-set on the successive sheets coming from the printing press has presented a serious problem.

While numerous attempts have been made to solve this problem, none of them, as far as we are aware, can be regarded as satisfactory. For example, the use of heat-set inks and steam-set inks, which were developed for this purpose, require the addition of large and expensive accessory equipment to the printing press in order to utilize the full productivity of the press; and the heat or steam tend to impair the dimensional stability of the paper and therefore the quality of the finished printed matter. The use of fine powder sprays or a transparent protective coating over the freshly printed surface (see Costello Patent No. 2,696,168, dated December 7, 1954) also requires considerable accessory equipment and is generally inconvenient.

It has also been proposed to increase the drying rate of printing inks by employing a catalyst or polymerization promoter for speeding up the drying of the vehicle, sometimes in conjunction with heat or radiation of certain light energy. These proposals likewise involve objectionable features which have barred or greatly limited their commercial use. For example, a printing ink containing a diacyl peroxide as the catalyst will undergo skinning and livering even after a short period of storage under ordinary conditions, due to the strong oxidizing effect of this peroxide on the eleostearin of the drying oil, as disclosed in Hooft Patent No. 2,109,774 dated March 1, 1938. Thus, Hooft proposed to apply the diacyl peroxide to the paper separately from the ink, which entails obvious disadvantages in commercial printing. Wendt Patents Nos. 2,453,769 and 2,453,770 disclose printing inks containing certain methane derivatives for promoting polymerization of the drying oil, and irradiation of the printed material with ultra-violet light of certain wave lengths: but this expedient is admittedly unsuitable when a heat bodied tung oil is used as the vehicle, and the use of pure eleostearin as suggested by Wendt will obviously result in an unstable product having too short a shelf life for commercial purposes.

The applicant is likewise aware of the compositions set forth in Sachs et al. Patent No. 2,579,095, wherein terminally unsaturated ethylenic resinophoric compounds are catalyzed by sulfonyl halides in the presence of visible or ultra-violet light. These compounds are unsuitable for use as a quick-drying vehicle since they liver and skin when subjected to general storage conditions. This fact is shown by the data set forth in Table II, herein.

The principal object of the present invention is to provide a quick-drying vehicle of the drying oil type and a method for rapidly indurating or drying such a vehicle. Another object is to provide a quick-drying printing ink and printing method which enable the printing press to operate at maximum speed with no smudging or off-setting on the successively printed sheets, and without impairing the dimensional stability of the paper. Further objects are to provide a quick-drying ink containing a polymerization promoter activated by ultra-violet light, or other forms of actinic energy, and to provide an ink of this character which is stable in that it can be stored for a long period of time under ordinary conditions without livering. (While we have referred in the above to sheet-fed presses, it will be understood that the invention is also applicable to web-fed presses.)

By a vehicle of the "drying oil type" we mean a vehicle containing a drying oil binder, which binder is characterized by having a conjugated system of double bonds. For example, linseed, poppy and tung oil are drying oils that are satisfactory. By "quick-drying" we mean that when the vehicle containing the ink pigment or other material is applied in a thin film (about 2 to 4 microns in thickness) as in printing, it will dry or set in a matter of seconds; that is, the surface of the film when irradiated up to about 20 seconds with the actinic energy, preferably ultra-violet light, becomes sufficiently dry so that in the case of a printing ink, for example, it will not off-set on succeeding sheets coming from the press. However, the drying action does not stop after the ultra-violet or activating energy is removed. On the contrary, in the practice of the present invention we have found that within a period of up to about 30 seconds after such removal of the activating energy, the polymerization or drying action has penetrated the entire film to provide a film which is hard throughout. On the other hand, a film of the same thickness consisting of the vehicle alone, when irradiated for the same period of time with the ultra-violet light, will dry through the entire depth of the film in this short period of irradiation, there being no inert pigment in the vehicle to slow down the polymerization rate.

The quick-drying vehicle of the present invention is non-aqueous and consists essentially of a drying oil binder, which is characterized by a conjugated system of double bonds, and a catalyst selected from the organic sulfonyl halide group.

The binder may be a single drying oil or a mixture of two or more oils. Any drying oil may be used, such as those commonly employed in printing inks and containing conjugated unsaturation, bodied tung oil being preferred as the conjugatedly unsaturated drying oil. As indicated above, however, the binder may comprise a conjugated drying oil, such as, tung oil and a portion of non-conjugated drying oil. However, if the binder contains less than about 30% conjugated unsaturation (i.e. if more than about 70% of the carbon to carbon bonds are of the saturated or unconjugated type), the vehicle will not undergo the rapid and complete polymerization which is preferred for the purpose of this invention.

I have found that compounds of the organic sulfonyl halide group act as a photopolymerization catalyst to promote a rapid polymerization of the binder when a film or coating of the vehicle is irradiated with ultra-violet light. The latter thus constitutes an activating means for triggering a reaction in which it seem that the catalyst readily absorbs ultra-violet light to form free radicals which, in turn, form free radicals with the binder of the vehicle. This provides a rapid reaction which completes the polymerization or drying of the vehicle in a matter of a few seconds.

We have further found that these compounds will not cause livering or skinning of the vehicle. Accordingly, the invention makes possible the formulation of vehicles having a long shelf-life.

The proportions of catalyst and binder in the vehicle are not critical, but we have found that for best results the catalyst should be present in an amount which is approximately 2–8% by weight of the binder.

The ultra-violet light used to trigger the polymerization reaction is preferably the full spectrum of ultra-violet, including 1800 A. to 4000 A., as we have found that isolated bands of the spectrum do not provide as rapid a polymerization as the full spectrum. An example of such a light source is a high pressure electronic discharge quartz mercury arc tube having an active length of about 1½ inches and drawing about 100 watts, the ultra-violet intensity of radiations of 3130 A. and shorter, measured at 20 inches distance, being over 250 microwatts per square centimeter.

The method of the invention comprises essentially the rapid induration of the drying oil binder by (1) forming a non-aqueous solution of the binder and the catalyst compound, (2) forming a film of the resulting vehicle, and (3) irradiating the film with actinic energy (preferably ultra-violet light) adapted to activate the catalyst to form free radicals.

In the preferred practice of the invention, the vehicle containing a pigment in the desired proportion is applied in any suitable manner in a film to the material to be coated, such as a paper, and is then irradiated with the ultra-violet light to trigger the polymerization reaction.

In the case of printing, the printing ink comprises the vehicle and, if desired, pigment suspended in the vehicle. The ink is applied in the usual manner by the printing press, and the source of ultra-violet light is positioned to irradiate the printed surfaces of the successive sheets coming from the press.

Examples of organic sulfonyl halides which have been found suitable and which are given by way of illustration, and not as a limitation of the generic invention include: methane sulfonyl chloride, ethane sulfonyl chloride, p-toluene sulfonyl chloride, 2,5-dimethyl benzene sulfonyl chloride, m-chloro-sulfonyl benzoyl chloride and 2-naphthalene sulfonyl chloride. A limitation as to the type of sulfonyl halide found suitable, is that such compound must be soluble in the vehicle.

The book "Organic Chemistry of Sulphur" by Suter, published by John Wiley & Sons, Inc., Chapter V, lists a large number of sulfonyl halides, and references may be had to the list given there for other sulfonyl halides.

Table I sets forth several examples of the new vehicle and shows as to each the condition of the vehicle after storage in bulk and also the time required to dry a film of the vehicle when irradiated. In each case, the sulfonyl halide was mixed with raw tung oil to form a vehicle containing 4% sulfonyl compound and 96% tung oil, by weight. A few drops of each vehicle were placed upon a glass miscroscope slide and spread out to a thin film with an accurately honed steel depth gage, so that the thickness of the various films was substantially uniform for comparative purposes; and in each case, the thin film on glass was placed one inch away from the ultra-violet source previously described and timed for complete polymerization to take place. The number of seconds required for the vehicle to polymerize or dry to a hard film, starting with the inception of the irradiation, is given for each compound. For comparative purposes, is was found that a similar film of bodied tung oil by itself required 95 seconds of similar irradiation before polymerizing to a hard film.

*Table I*

| Sulfonyl Halide | Storage Period (Months) | Condition After Storage | Seconds to Dry |
| --- | --- | --- | --- |
| Methane sulfonyl chloride | 6 | Clear Liquid | 7 |
| Ethane sulfonyl chloride | 6 | do | 8 |
| p-Toluene Sulfonyl chloride | 6 | do | 8 |
| 2,5-Dimethyl benzene sulfonyl chloride. | 6 | do | 8 |
| m-Chlorosulfonyl benzoyl chloride. | 6 | do | 3 |
| 2-Naphthaline sulfonyl chloride | 6 | do | 3 |

The data in Table I clearly show that the vehicle may undergo substantially long storage periods without livering or skinning and yet the composition is very sensitive to the action of ultra-violet or other actinic energy radiation as evidenced by the rapid dry times obtained.

Table II gives storage or shelf-life data of these same sulfonyl halides in methyl methacrylate, one of the terminal unsaturated monomers mentioned in Sachs Patent No. 2,579,095. In each case, the sulfonyl halide comprised 4% by weight of the monomer-sulfonyl halide mass.

*Table II*

| Sulfonyl Halide | Storage Period (Months) | Condition of Vehicle |
| --- | --- | --- |
| Methane sulfonyl chloride | 2 | Solid. |
| Ethane sulfonyl chloride | 2 | Do. |
| p-Toluene sulfonyl chloride | 2 | Do. |
| 2,5-Dimethyl benzene sulfonyl chloride | 2 | Do. |
| m-Chlorosulfonyl benzoyl chloride | 2 | Do. |
| 2-Naphthalene sulfonyl chloride | 2 | Rigid Gel. |
| Sulfuryl chloride | 2 | Solid. |

Table II shows that the vehicles described therein are totally unsatisfactory as vehicles for a quick-drying ink due to their relatively short shelf-life.

We claim:

1. A method for rapidly indurating a drying oil having a conjugated system of double bonds, which comprises forming a non-aqueous solution of said drying oil and an oil soluble organic sulfonyl halide, said drying oil and sulfonyl halide composition having a viscosity that enables it to be applied as a thin coating, forming a film of said solution and irradiating said film with actinic energy.

2. The method according to claim 1, in which said actinic energy is ultra-violet light.

3. The method according to claim 1, in which said actinic energy is the full spectrum of ultra-violet light.

4. The method according to claim 1, in which said drying oil has a conjugated unsaturation of at least about 30%.

5. The method according to claim 1 in which the oil soluble organic sulfonyl halide is a sulfonyl chloride.

6. In the art of printing a sheet, the improvement which comprises forming a non-aqueous solution of a drying oil having a conjugated system of double bonds and an oil soluble organic sulfonyl halide, said solution containing a pigment in suspension to form an ink, said ink having a viscosity that enables it to be applied as a this coating printing the sheet with said ink, and irradiating the printed surface of the sheet with actinic energy.

7. The method according to claim 6, in which said actinic energy is ultra-violet light.

8. The method according to claim 6, in which said actinic energy is the full spectrum of ultra-violet light.

9. The method according to claim 6, in which said drying oil has a conjugated unsaturation of at least about 30%.

10. The method according to claim 6 in which the oil soluble organic sulfonyl halide is a sulfonyl chloride.

11. A stable non-aqueous quick-drying printing ink which comprises a drying oil having a conjugated system of double bonds and an oil-soluble organic sulfonyl halide, said drying oil and sulfonyl halide being present in a substantially unreacted form and said printing ink being adapted to quickly dry when exposed in a thin film to actinic energy.

12. A printing ink according to claim 11, in which the drying oil has a conjugated unsaturation of at least about 30%.

13. A printing ink according to claim 11, in which the sulfonyl halide is present in an amount which is approximately 2–8% by weight of the drying oil.

14. A printing ink according to claim 11 in which the oil soluble organic sulfonyl halide is a sulfonyl chloride.

15. A printing ink according to claim 11 wherein the organic sulfonyl halide is selected from the group consisting of lower alkyl sulfonyl chlorides, mono nuclear aromatic sulfonyl chlorides and naphthalenic sulfonyl chlorides.

16. A stable quick drying printing ink comprising a solution of a drying oil having a conjugated system of double bonds, a pigment suspended in the drying oil, and an oil-soluble organic sulfonyl halide, said drying oil and sulfonyl halide being present in a substantially unreacted form and said printing ink being adapted to quickly dry when exposed in a thin film to actinic energy.

17. A printing ink according to claim 16, in which the drying oil has a conjugated unsaturation of at least about 30%.

18. A printing ink according to claim 16 in which the oil soluble organic sulfonyl halide is a sulfonyl chloride.

References Cited in the file of this patent

UNITED STATES PATENTS

| | | |
|---|---|---|
| 1,980,367 | Auer | Nov. 13, 1934 |
| 2,180,342 | Auer | Nov. 21, 1939 |
| 2,406,878 | Whyzuzis et al. | Sept. 3, 1946 |
| 2,453,769 | Wendt | Nov. 16, 1948 |
| 2,579,095 | Sachs et al. | Dec. 18, 1951 |

UNITED STATES PATENT OFFICE
CERTIFICATE OF CORRECTION

Patent No. 3,052,568                              September 4, 1962

Benjamin L. Sites et al.

It is hereby certified that error appears in the above numbered patent requiring correction and that the said Letters Patent should read as corrected below.

Column 1, line 34, for "graphic arts" read -- Graphic Arts --; column 4, Table I, first column, line 8, thereof, for "2-Naphthaline" read -- 2-Naphthalene --; column 5, line 12, for "this" read -- thin --.

Signed and sealed this 1st day of January 1963.

(SEAL)
Attest:

ERNEST W. SWIDER                          DAVID L. LADD
Attesting Officer                            Commissioner of Patents